United States Patent
Rampal et al.

(10) Patent No.: US 12,526,187 B2
(45) Date of Patent: Jan. 13, 2026

(54) DETERMINING CELL UPGRADE

(71) Applicant: Telefonaktiebolaget LM Ericsson (publ), Stockholm (SE)

(72) Inventors: Karan Rampal, Stockholm (SE); Javier Rasines, Solna (SE); Anderson Falci, São Paulo (BR); Raúl Martin Cuerdo, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

(21) Appl. No.: 17/923,975

(22) PCT Filed: Jul. 22, 2020

(86) PCT No.: PCT/IB2020/056925
§ 371 (c)(1),
(2) Date: Nov. 8, 2022

(87) PCT Pub. No.: WO2021/229285
PCT Pub. Date: Nov. 18, 2021

(65) Prior Publication Data
US 2023/0179477 A1    Jun. 8, 2023

(30) Foreign Application Priority Data

May 14, 2020   (EP) .................................. 20382408

(51) Int. Cl.
*H04L 41/0813*   (2022.01)
*H04L 41/16*   (2022.01)
*H04B 7/0452*   (2017.01)

(52) U.S. Cl.
CPC .......... *H04L 41/0813* (2013.01); *H04L 41/16* (2013.01); *H04B 7/0452* (2013.01)

(58) Field of Classification Search
CPC .... H04L 41/0813; H04L 41/16; H04B 7/0452
See application file for complete search history.

(56) References Cited

U.S. PATENT DOCUMENTS

2019/0014487 A1* 1/2019 Yang .................. G06N 3/084
2020/0106536 A1    4/2020 Bedekar

OTHER PUBLICATIONS

International Search Report and Written Opinion dated Mar. 30, 2021 issued in PCT Application No. PCT/IB2020/056925, consisting of 18 pages.

(Continued)

*Primary Examiner* — Melvin C Marcelo
*Assistant Examiner* — Natali Pascual Peguero
(74) *Attorney, Agent, or Firm* — Sonoda & Kobayashi Intellectual Property Law; Sarvajit S. Patil

(57) ABSTRACT

Embodiments described herein relate to methods and apparatus for determining cell upgrades, for example whether to upgrade a Long Term Evolution (LTE) cell to Massive Multiple Input Multiple Output (M-MIMO) technology. There is provided a method for determining a cell upgrade metric. The method receives samples having user session data from user equipment communicating within a cell. Training data is obtained from the samples by applying a filtering rule and an autoencoder trained using the samples. The encoder and code layers of the trained autoencoder are combined with a classifier network to generate a combined classification network. The combined classification network is trained using the training data. The trained combined classifier network is used to classify user session data within the same or a different cell and using a plurality of the classifications to determine the cell upgrade metric for the cell.

20 Claims, 10 Drawing Sheets

(56) References Cited

OTHER PUBLICATIONS

Yaohua Sun et al., Application of Machine Learning in Wireless Networks: Key Techniques and Open Issues; arxiv.org. Cornell University Library, Sep. 24, 2018, consisting of 34 pages.
Junyuan Xie et al., Unsupervised Deep Embedding for Clustering Analysis; Proceedings of the 33rd International Conference on Machine Learning, New York, NY, JMLR: W&CP vol. 48, May 24, 2016, consisting of 10 pages.

* cited by examiner

DETERMINING CELL UPGRADE

CROSS-REFERENCE TO RELATED APPLICATIONS

This application is a Submission Under 35 U.S.C. § 371 for U.S. National Stage Patent Application of International Application No.: PCT/IB2020/056925, filed Jul. 22, 2020 entitled "DETERMINING CELL UPGRADE," which claims priority to EP Application Serial No. 20382408.1, filed May 14, 2020 the entireties of both of which are incorporated herein by reference.

TECHNICAL FIELD

Embodiments disclosed herein relate to methods and apparatus for determining cell upgrades, for example whether to upgrade a Long Term Evolution (LTE) cell to Massive Multiple Input Multiple Output (M-MIMO) technology.

BACKGROUND

As use of and demand for cellular communications services grows, some existing cellular equipment may not be able to support increased traffic or service demand. Therefore, operators need an approach to determine which cells may benefit from an upgrade to newer and/or improved service provision equipment. For example, operators may wish to determine which of their LTE cells would benefit from an upgrade to equipment supporting M-MIMO technology.

Current approaches for LTE cell qualification to decide upon investments for enhanced M-MIMO features are based on Performance Management (PM) counters and rigid rules-based decisions. PM counters may be used to determine various metrics such: Call Setup Success rate that measures the combined accessibility of users: the Access Network Retainability which evaluates the capability of the network to retain services requested by users; switch queues and CPU load; number of connections and many others. Different PM counters may be specified for different equipment and for equipment from different vendors.

SUMMARY

PM counter approaches are aggregated at cell level and hence represent the entire user equipment (UE) ecosystem within a given cell using statistical metrics such as average, median and quantiles. However, this does not allow the consideration of more granular UE specific metrics such as quality versus distance or UE to cell metrics such as UE throughput versus cell load. Furthermore, not all cells will benefit equally from a cell upgrade, and this may be dependent on characteristics of the propagation environment within the cell, for example whether there are multiple propagation pathways between the base station (e-Node B or eNB) and UE such as Smartphones According to certain embodiments described herein there is a method for determining a cell upgrade metric. The method receives samples comprising user session data from user equipment communicating within a cell. Training data is obtained from the samples by applying filtering rule and an autoencoder trained using the samples. The encoder and code layers of the trained autoencoder are combined with a classifier network to generate a combined classification network. The combined classification network is trained using the training data. The trained combined classifier network is used to classify user session data within the same or a different cell and using a plurality of said classifications to determine the cell upgrade metric for said cell.

The use of user session data allows improved and more granular characterisation of cells by characterising each end users radio environment individually. This allows appropriate correlation with other metrics such as aggregate cell metrics or geo-spatial considerations such as user angular distribution analysis. The large amount of this data may be effectively processed using a suitably trained and architected classification network.

According to certain embodiments described herein there is provided a method for recommending a cell upgrade. The method comprises receiving user session data and cell metrics over an assessment period and generating samples by characterising user session data over respective sample periods from user equipment communicating within a cell and time-correlating the characterised user session data with cell metrics. A trained classifier network is used to classify the samples as being improvable with the upgrade together with a confidence score. The cell upgrade recommendation depends on the proportion of samples classified as being improvable and the confidence scores.

According to certain embodiments described herein there are also providing corresponding apparatus and computer programs comprising instructions which, when executed on a processor, causes the processor to carry out the methods described herein. The computer program may be stored on a non transitory computer readable media.

BRIEF DESCRIPTION OF DRAWINGS

For a better understanding of the embodiments of the present disclosure, and to show how it may be put into effect, reference will now be made, by way of example only, to the accompanying drawings, in which.

DESCRIPTION

Figure 1:
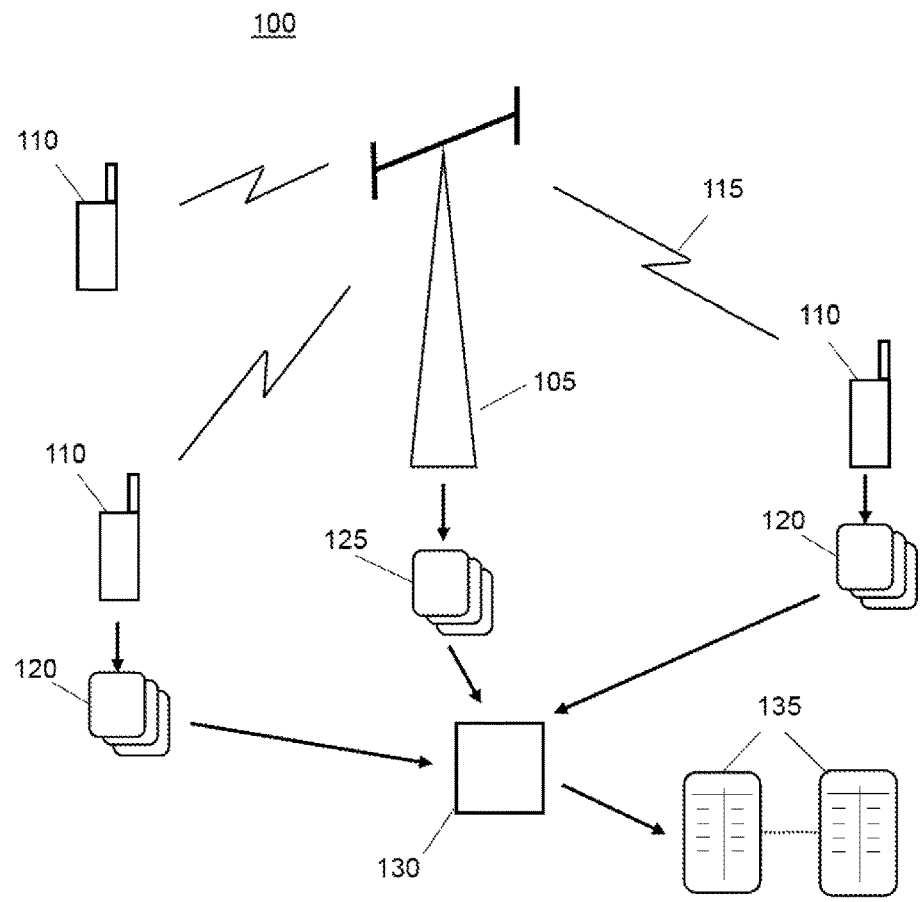
FIG. 1 is a schematic diagram illustrating collection of samples in a communications system and according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions. Memory may be employed to storing temporary variables, holding and transfer of data between processes, non-volatile configuration settings, standard messaging formats and the like. Any suitable form of volatile memory and non-volatile storage may be employed including Random Access Memory (RAM) implemented as Metal Oxide Semiconductors (MOS) or Integrated Circuits (IC), and storage implemented as hard disk drives and flash memory.

Embodiments described herein relate to methods and apparatus for determining cell upgrade metrics, ranking cells for upgrade and/or recommending cell upgrades. The analysis of user data sessions allows for improved characterization of cells and hence improved upgrade metrics, ranking and recommendations. However, the analysis of such large amounts of data presents challenges which are addressed using improved classification network building and training.

FIG. 1 is a schematic diagram illustrating collection of samples in a communications system and according to an embodiment. The communications system 100 may be a wireless communications cell such as a Long Term Evolution (LTE) cell comprising a base station or eNodeB 105 and a plurality of user equipment (UE) 110 connected to the eNodeB by respective wireless connections 115. Each UE may generate user session data 120 comprising parameters and metrics relating to its connection with the eNodeB 105. Similarly, the eNodeB 105 may generate cell metrics relating to the aggregate performance of the eNodeB 105 in servicing the various UE 110.

The user data sessions 120 and cell metrics 125 may be in the form of Cell Trace Recording (CTR) binary files specified by 3GPP standards and are a collection of specific events representing a mix of performance metrics and user capabilities and which are collected periodically. Some of the metric values may change rapidly such as radio measurements, some may change slowly or be fixed for a session such as user capability. Table 1 below illustrates some example CTR events 120, including UE session related events, cell or eNodeB events, UE sessions control events and UE geo-positioning events. These examples are shown for explanatory purposes and are not intended to be limiting.

TABLE 1

| Event Name | Event ID | |
|---|---|---|
| INTERNAL_EVENT_UE_CAPABILITY | 5172 | |
| INTERNAL_PER_RADIO_UE_MEASUREMENT_TA | 3108 | |
| INTERNAL_EVENT_UE_MOBILITY_EVAL | 5193 | Ue radio related |
| INTERNAL_PER_RADIO_UE_MEASUREMENT | 3075 | events |
| INTERNAL_PER_UE_TRAFFIC_REP | 3076 | |
| INTERNAL_PER_UE_RB_TRAFFIC_REP | 3077 | |
| INTERNAL_PER_RADIO_CELL_MEASUREMENT | 3081 | Cell radio |
| INTERNAL_PER_RADIO_UTILIZATION | 3072 | related events |
| INTERNAL_PER_CELL_TRAFFIC_REPORT | 3079 | |
| INTERNAL_PROC_UE_CTXT_RELEASE | 4125 | |
| INTERNAL_PROC_RRC_CONN_SETUP | 4097 | Ue session |
| INTERNAL_PROC_HO_EXEC_S1_IN | 4105 | control events |
| INTERNAL_PROC_HO_EXEC_X2_IN | 4113 | |
| INTERNAL_PROC_RRC_CONNECTION_RE_ESTABLISHMENT | 4121 | |
| INTERNAL_PER_UE_MDT_M1_REPORT | 3112 | Ue geo-positioning event |

The user session data 120 and cell metrics 125 are correlated by a correlator 130 to generate samples or data units 135. The correlator may be implemented by a processor and memory and time-correlates the various data 120, 125 to generate periodic samples 135. For example, the data may be aggregated and correlated to generate a sample every 60 seconds and may comprise a UE capability metric unchanged over that period together with an average of a measurement taken every 1 second over the 60 second period. Similarly, data that is updated less frequently than 60 seconds may be interpolated to determine a suitable value for the current sample period. Other metrics to be included in the samples may be calculated from the data received from the UE 110 and/or eNodeB. Data from each UE 115 as well as the eNodeB may be collected and time correlated using system time stamps. Certain data may be selected for inclusion in the sample as well as certain calculated metrics, for example data related to MIMO use and performance, whilst other data may be omitted.

Table 2 below shows an example of a sample 135.

TABLE 2

| FEATURE | DESCRIPTION |
|---|---|
| Features for Ue session classifier | |
| UNIQUE_SESS | Unique ue session identifier when session is alive on a concrete cell |
| SINR_MEAS_PUCCH | Ue Signal to interference noise ratio distribution in uplink control channel |
| SINR_MEAS_PUSCH | Ue Signal to interference noise ratio distribution in uplink shared data channel |
| CQI/CQI_x | Ue Global Downlink Channel Quality Indicator distribution and CQI distribution per Ue branch |
| EVENT_PARAM_RANK_REPORTED | Ue Rank Indicator distribution; number of orthogonal radio layers that can be established per ue session |
| EVENT_PARAM_RANK_TX | Ue Transmission mode distribution; actual number of radio layers established |
| EVENT_PARAM_TBSPWRRESTRICTED | Ue Flag for Ues transmitting at maximum power |
| MIMO_2 × 2_CAP | Ue Flag for MIMO 2 × 2 capable Ues |
| MIMO_4 × 4_CAP | Ue Flag for MIMO 4 × 4 capable Ues |
| TM9_CAP | Ue Flag for TM9 capable Ue |
| TA | Ue Timing advance distribution of the ue session |
| DTX_DL | Ue average number of HARQ retransmission because of discontinuous transmission in downlink |
| DTX_UL | Ue average number of HARQ retransmission because of discontinuous transmission in uplink |
| EVENT_PARAM_PER_UE_THP_DL_DRB | Ue session throughput distribution in downlink |
| EVENT_PARAM_PER_UE_THP_UL_DRB | Ue session throughput distribution in uplink |
| SESSION_TRAFFIC_TYPE | Ue Flag to characterize ue sessions with relevant volume |
| MAC_VOL_DRB_DL_CELL | Cell downlink MAC volume |
| MAC_VOL_UL_CELL | Cell uplink MAC volume |
| EVENT_PARAM_PER_UE_THP_MACVOL_DRB_DL | Ue level downlink MAC volume |
| EVENT_PARAM_PER_UE_THP_MACVOL_UL | Ue level uplink MAC volume |
| RLC_DELAY | Ue radio link control delay |
| PL | Cell path loss distribution of connected users |
| RRC_ATT | Cell radio resource control connection attempts |
| CCE_UTIL | Cell average number of control channel element resources used |
| ACTIVE_UE_DL_AVG | Cell average number of active users in downlink |
| ACTIVE_UE_UL_AVG | Cell average number of active users in uplink |
| EVENT_PARAM_CELL_BITRATE_DL_DRB | Cell average normalized bitrate in downlink |
| EVENT_PARAM_CELL_BITRATE_UL_DRB | Cell average normalized bitrate in uplink |
| PRB_DL | Cell average physical resource block utilization in downlink |
| CELL_EDGE_FLAG | Ue Flag for users at cell edge |
| Features for geo-positioning analysis | |
| DISTANCE | Distance from every sample reported to the serving cell location |
| TR_H_ANGLE | Relative horizontal angle of arrival of every sample reported versus the azimuth of the serving cell |
| DS_1 | Flag for left lobe location if Digital Sectoring is implemented |
| DS_2 | Flag for right lobe location if Digital Sectoring is implemented |
| BT | Flag for boresight location if Digital Sectoring is implemented |
| RELATIVE_HEIGHT | Relative height from sample reported versus the cell antenna height |
| V_ANGLE | Relative vertical angle of arrival of every sample reported versus the cell antenna position |

Figure 2:
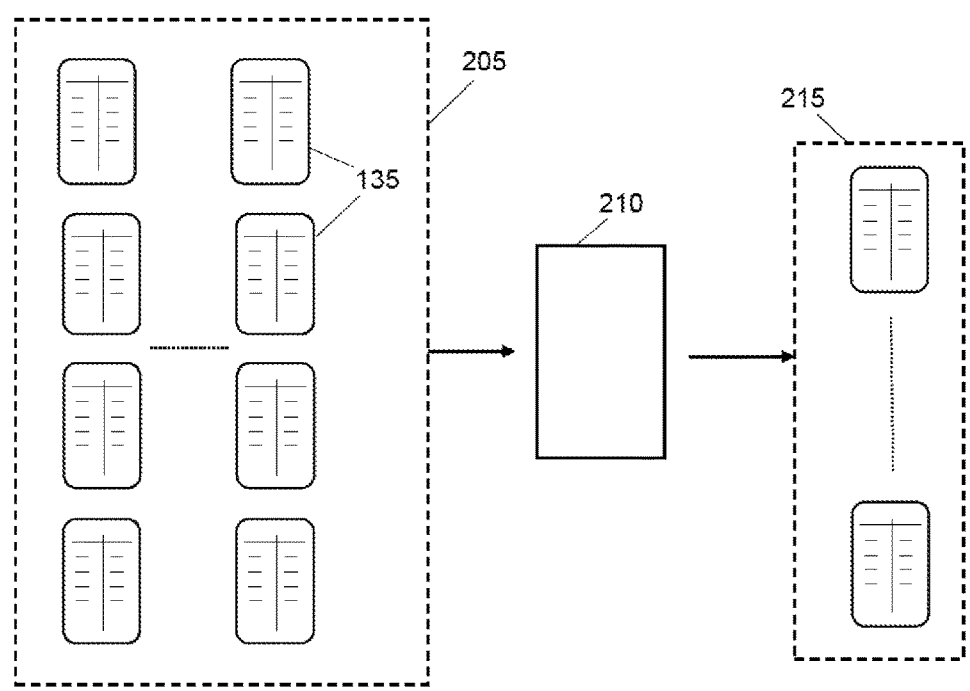
FIG. 2 is a schematic illustrating filtering of samples to generate training data according to some embodiments.

FIG. 2 is a schematic illustrating filtering of samples to generate training data according to an embodiment. The correlator of FIG. 1 generates a large number of samples for each UE 110. Some of this set of samples 205 may support an upgrade and some may not. Some samples of each category (upgrade or not upgrade) can be selected using expert rules 210 applied to the samples 135 to select a smaller set of training data 215 including samples that support an upgrade and samples which don't. For example, certain metrics above a threshold may indicate that using Massive-Multiple Input-Multiple Output (M-MIMO) would improve the user session whereas other metrics below a threshold may indicate that M-MIMO would provide no benefit. The combination of these comparisons of metrics against respective thresholds may be used to indicate whether the user session as a whole would benefit from a M-MIMO upgrade. For example, if the sample indicates that the UE is not MIMO capable the sample can be disregarded as not useful for training data, though it is retained in the overall set of samples 205. However, a sample where MIMO_2×2_cap is true, Event+Param_Rank_Reported is above a threshold number of orthogonal layers, and SINK_MEAS_PUSCH is within a certain range may indicate a suitable M-MIMO upgrade sample for the training set.

The aim of applying the expert rules 210 to filter the samples is to identify which of the samples 135 represent the best cases of the two classes—for example M-MIMO would improve and M-MIMO would not improve. The expert rules may be determined by Radio Network Design and Optimization (NDO) experts and effectively provide low noise samples of each class.

Figure 3:
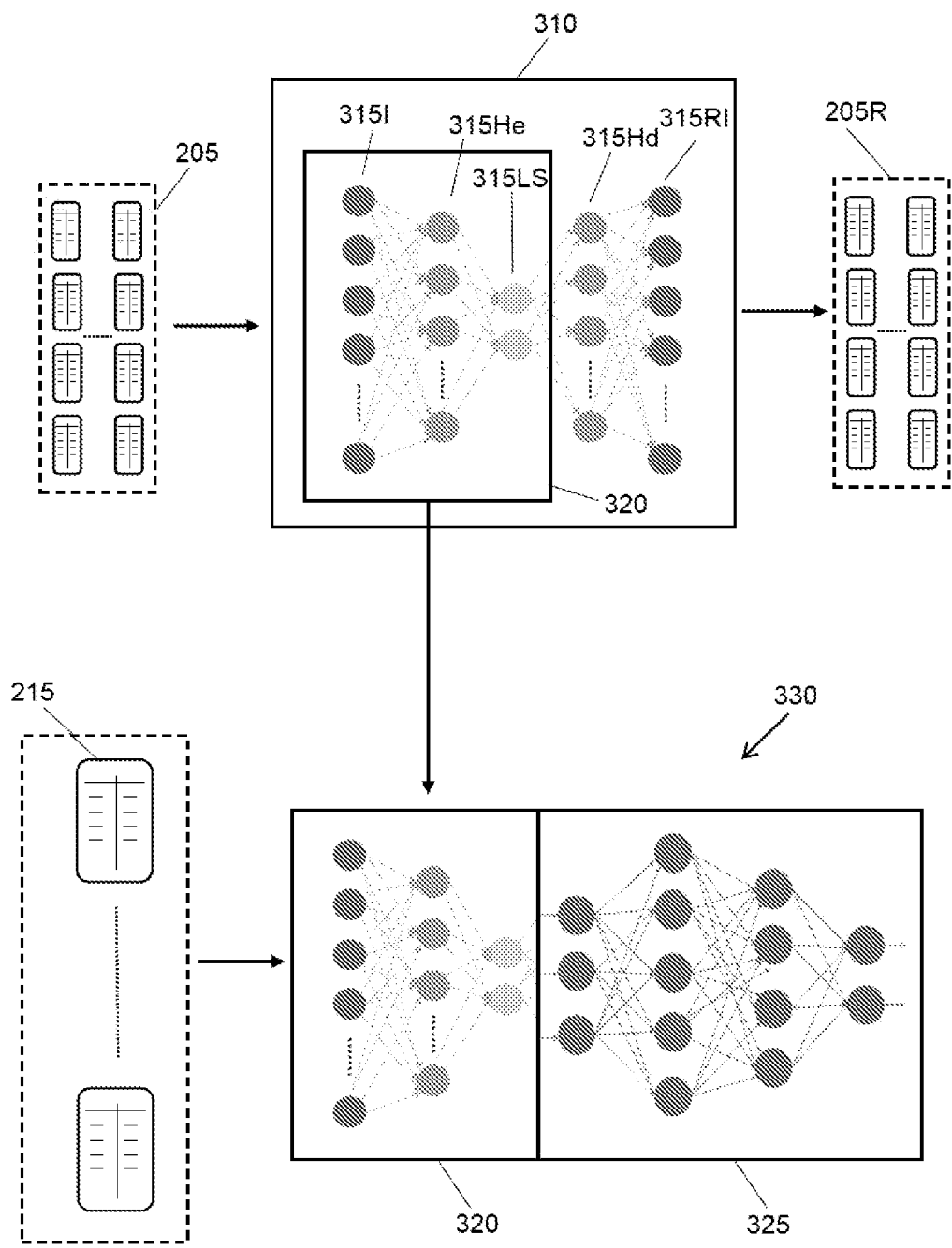
FIG. 3 is a schematic illustrating construction and training of a classification network according to some embodiments.

FIG. 3 illustrates building and training a classifier network suitable for processing samples. In a first step, an autoencoder network 310 is trained using a set of samples 205. A set of samples from one or more UE 110 may be used and additional samples sets 210 from other cells may additionally be used. An autoencoder is a type of artificial neural network used to learn efficient data representations, vectors or codes in an unsupervised manner. The autoencoder network includes a number of layers including an input layer 315I, encoder layer(s) 315He, code layer 315LS, decoder layer(s) 315Hd and output layer 315R1. The autoencoder network 310 is trained to reconstruct the input at the output. Once trained, the code layer 315LS can be used to represent the inputs efficiently using dimensionality reduction, effectively training the network to ignore noise and focus on the most important aspects. The autoencoder network 310 is trained to generate reconstructed samples 205R from the reduced encoding which sufficiently closely resemble the input samples 205.

The trained autoencoder 310 effectively translates a CTR sample into a compact vector representation or code and can be used as the input to a classification network. Using a trained autoencoder as part of a classifier network, as opposed to just using and training a classifier network, provides a number of advantages including training the autoencoder on all samples rather than using only training data on a normal classifier network. By using all samples for training, these are not limited by expert rules. By training the autoencoder on all samples, the compact representation considers all the different scenarios of the samples, so the compact vectors or codes are more data dense and therefore more meaningful. This also offers a check on the progress and generalization of the training algorithm by checking the reconstruction loss so issues can be addressed sooner.

Once trained, the encoder and code layers 320 of the autoencoder network 310 are combined with a classifier network 325 to generate a combined classifier network 330. Any suitable multilayer binary artificial neural network may be employed. Layers may include convolutional, pooling and non-linear functions such as RELU activation and Sigmoid activation.

After the combined classifier 330 is assembled, it is trained using the training set 215 to determine samples indicating M-MIMO upgrade improvement and those indicating no M-MIMO upgrade improvement. The use of this two-stage classifier improves the classifier's generalization whilst focusing on the more important features of the samples to classify a sample.

Further training may be used. For example, the autoencoder may be further trained using sample sets 210 from other UE 110 in the cell 100 and UE in other cells, to help further generalize the coder 320 part of the combined classifier network 330. In addition, expert rules may be applied to other sample sets 210 to get additional training data, for example from other UE 110 in the same cell 100 or UE in other cells. The additional training data may be used to further optimize the combined classifier network 330.

Figure 4:
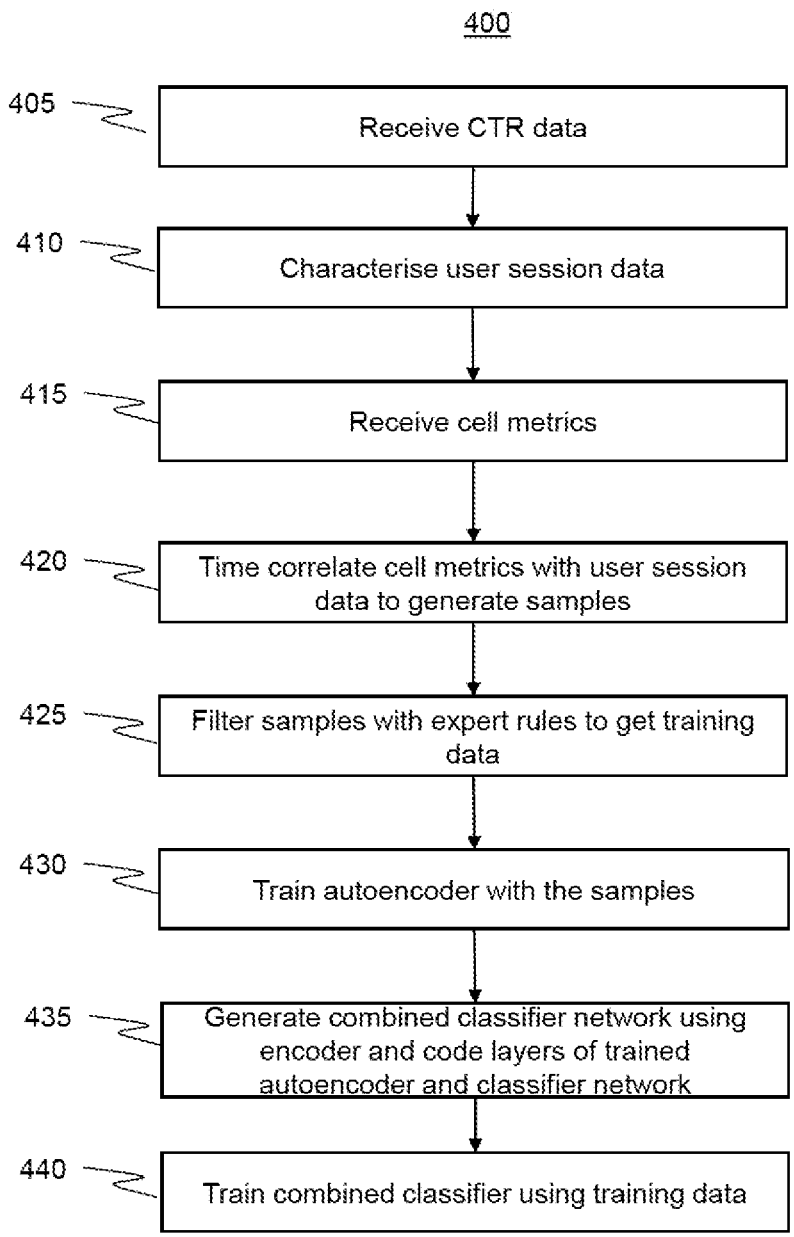
FIG. 4 is a flow diagram illustrating construction and training of a classification network according to some embodiments.

FIG. 4 is a flow chart showing a method of building and training a classifier network for determining cell upgrade metrics for a cellular communications network. At step 405 the method receives user session data such as CTR data from a UE. As noted above, CTR are defined by 3GPP standards and will be readily available from standards compliant UE. At step 410, the user session data is characterized for example by averaging measurements over a sample period, calculating metrics over the sample period based on one or more measurements. This characterization provides values for each sample period which are added to the respective sample.

At step 415, the method may also receive cell metrics from the eNodeB and which typically characterize cell performance in the aggregate. At step 420 these may be time-correlated with the user data in the samples to generate more comprehensive samples.

At step 425, the samples are filtered using expert rules as previously described. For example, a set of samples 210 is reduced to a smaller set of training data 220 having samples which clearly fall into one of two categories. The use of a smaller set of well characterized samples makes it easier to train the classifier.

At step 430, an autoencoder network is trained using the full sample set as previously described. The autoencoder is trained to replicate samples over the full range of samples. At step 435 the encoder and code layers of the trained autoencoder are combined with a classifier network to generate a combined classifier network as previously described. At step 440, the combined classifier network is trained using the training data determined at step 425.

Once trained, the combined classifier network may be used to classify samples from other UE in the same and different cells. As noted above, some further training of the autoencoder and/or combined classifier network may be performed using samples from other UE and/or cells.

The input to the trained combined classifier are samples for a unique UE session within a cell, for example as shown in Table 2 above. The output of the trained combined classifier are a CONFIDENCE and an UPGRADE cell upgrade metric. The CONFIDENCE is the probability output of the combined classifier for every unique user session. UPGRADE compares this probability against a threshold and if higher becomes 1 (improvement by upgrading) otherwise 0 (no improvement by upgrading). For example, some user sessions may be classified as M-MIMO suitable and hence would benefit from a M-MIMO upgrade, whereas other UE sessions may be classified as not M-MIMO suitable and hence would not benefit from a M-MIMO upgrade.

Figure 5:
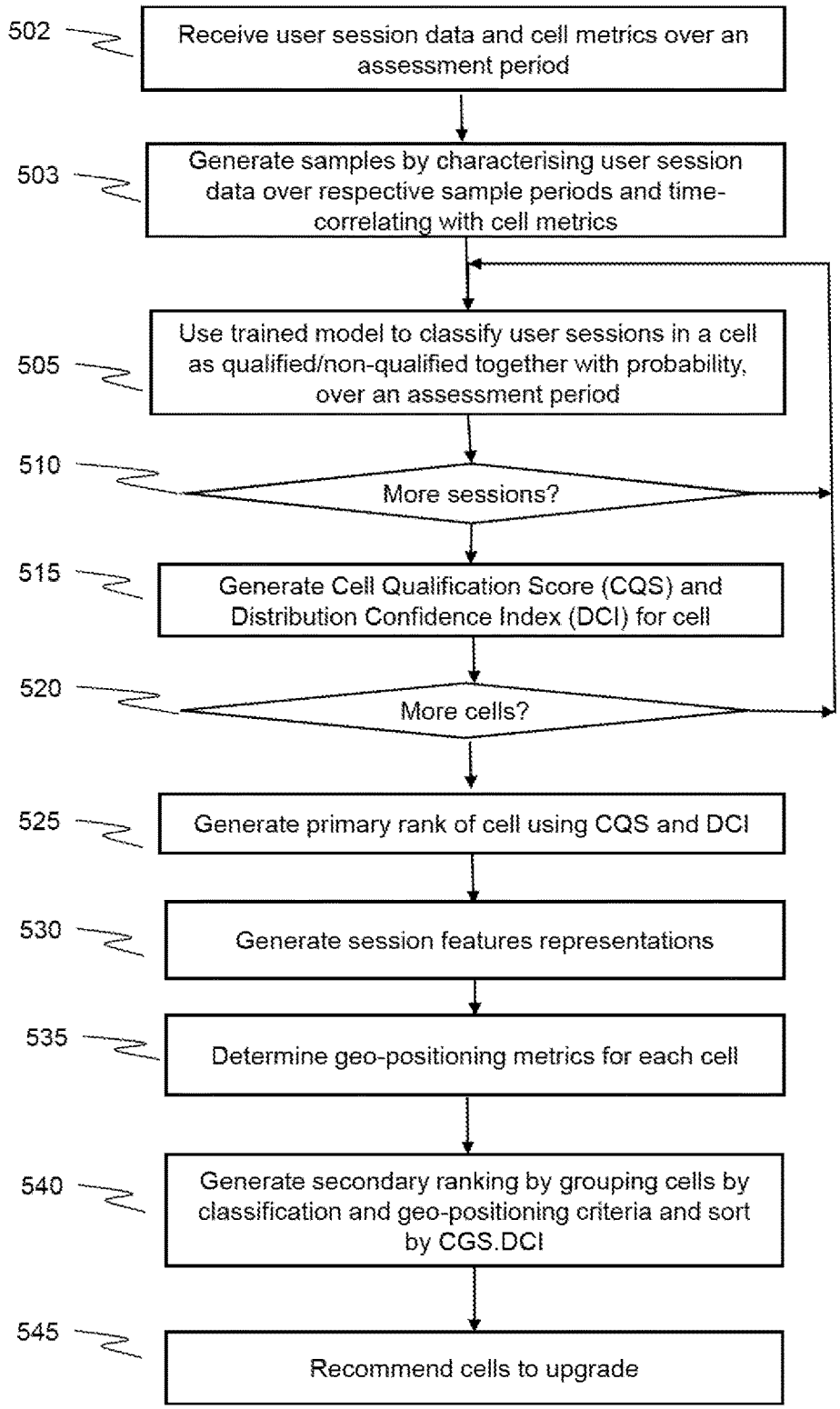
FIG. 5 is a flow diagram of using a trained classifier network to determine a cell upgrade metric or to rank cells according to some embodiments.

FIG. 5 illustrates a method of recommending a cell upgrade. At step 502, the method receives user session data 120 and cell metrics 125 over an assessment period which may be several hours or even days. The user session data and cells metrics are the same type of information used in training the combined classifier network and as described above are used to generate samples at step 503. The samples are generated for respective sample periods, for example every 60 seconds, and characterize the user session data over that time and time-correlate this with cell metrics. Each user session may last from several seconds to a number of hours and will be associated with a number of samples.

At step 505, the method uses the trained combined classifier network 330 to classify each user session within the cell over the assessment period. The network determines cell upgrade metrics (CONFIDENCE and UPGRADE) for each user session. At step 510 the method determines whether there are more sessions to classify and if so returns to step 505, otherwise moves on to step 515.

At step 515, the method determines further cell upgrade metrics relating to the aggregate of the user session classifications for the cell over the assessment period. Qualified and non-qualified user sessions are grouped and analyzed for the cell. The aggregate cell upgrade metrics calculated in the embodiment are Cell Qualification Score (CQS) and Distribution Confidence Index (DCI), although other metrics could alternatively be used. CQS represents the percentage of user sessions with CONFIDENCE greater than a threshold (threshold1). In this example threshold1 is the same threshold use to determine UPGRADE and CQS compares the number of UE sessions which would benefit from an upgrade compared with the total number of UE sessions.

DCI represents how close the distribution of probabilities is to the ideal case for an upgrade which is determined by expert rules and the generalization of the classifier network. DCI can also be used to monitor machine learning performance, for example if the DCI is consistently low for cells this may indicate more training is required. The CONFIDENCE outputs for the user sessions of a cell are divided into three bins or ranges—0 to 30%, 30% to 70%, 70% to 100%. DCI is the percentage of samples in the first (0-30%) and third (70-100%) range. The higher the DCI the more confident the method can be about whether to upgrade or not as most user sessions fall clearly into either the upgrade or not upgrade groups. For example if CQS is high, indicating most user sessions support an upgrade and DCI is also high indicating that most user sessions are clearly either upgrade or not upgrade (with few in the unclear middle zone), then these cell upgrade metrics indicate that an upgrade to M-MIMO would provide a significant improvement to overall cell performance. On the other hand, if the DCI is low then most probabilities or CONFIDENCE outputs are in the 30-70% range and hence the majority of user sessions are in between desirable and non-desirable radio scenarios and so it is less clear whether an upgrade would be beneficial.

Figure 6:
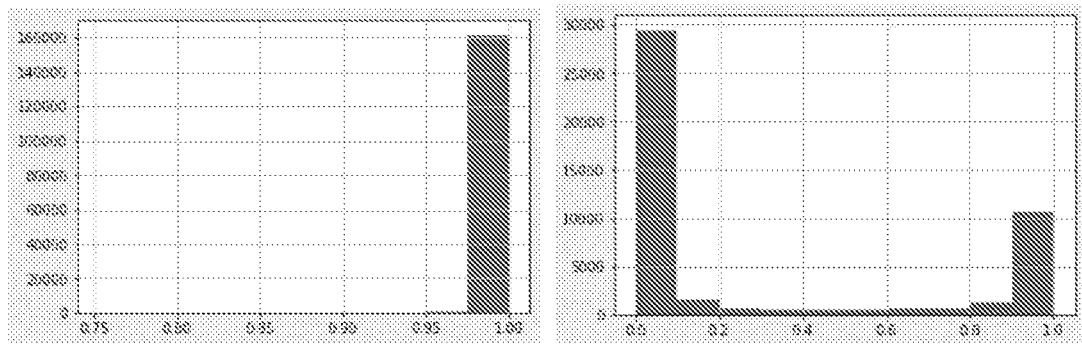
FIG. 6 illustrates example cell probability metrics according to some embodiments.

FIG. 6 illustrates example CONFIDENCE or probability metrics as a histogram, showing the number of user sessions (y) versus the probability range (x). The first graph (left) illustrates a high degree of confidence as most user session classifier outputs are indicative of recommending a cell upgrade. The second graph (right) shows a mix of high and mostly low CONFIDENCE outputs, with few in the middle range. Whilst not as clear as the first graph, this second graph displays with a reasonably high degree of confidence that in this case the cell would not benefit from an upgrade.

Referring back to FIG. 5, at step 520 the method determines whether there are further cells to analyses and if so returns to step 505. Once all cells have been analysed the method moves on to step 525 where a primary ranking of the cells is generated using the aggregated cell upgrade metrics. In an embodiment the primary rank is based on the product of CQS and DCI for each cell. Cells with a high CQS and a high DCI have a higher rank than cells with a high CQS but a low DCI.

The method then moves to step 530 where the primary rank may be augmented with representations of session features based on further analysis of certain user session parameters or metrics that are relevant to the upgrade, for example those that are relevant to MIMO characterization. FIGS. 7A-7D show representations of relevant features for MIMO characterization at cell level, in this example a high and a low ranking cell. For example, the first parameter shown is active_ue_dl_avg which is the average number of active users in downlink (with data pending to be transmitted in the eNB buffer) during any of the sampling periods for both a high ranking cell (left) and a low ranking cell (right). The representation or box is made up of parameter values for each user session with the 25th and 75th quartiles bounded to generate the box shown. As can be seen, for the first parameter, the high ranking cell has a range of 5-8.5 whereas the low ranking cell has a range of 0.5-1.6. In a similar manner, other parameters for the high and low ranking cell can be analyzed. These representations may be used to support the ranking by representing the values of various relevant session features in different cells and can therefore add confidence to the rankings for a user.

At step 535, the method determines geo-positioning metrics for each cell. Table 3 below shows example metrics that may be calculated.

TABLE 3

| Metric | Description |
| --- | --- |
| x_ANGLE_VALID_SAMPLES | Number of valid samples containing horizontal/vertical angle info |
| x_ANGLE_SPREAD_LOW | Angle of lower percentile (default 25%) of horizontal/vertical angle distribution of the cell traffic |
| x_ANGLE_SPREAD_HIGH | Angle of higher percentile (default 75%) of horizontal/vertical angle distribution of the cell traffic |
| H_ANGLE_SPREAD_KURTOSIS | Kurtosis metric of horizontal angle distribution of the cell traffic |
| x_ANGLE_SPREAD_QUALIFY | Horizontal/vertical angle difference between spread_low and spread_high |
| x_ANGLE_CRITERIA_FULFILLMENT | Indicates if the horizontal/vertical angle distribution fulfills the method criteria |

At step 540, the method further group and rank the cells using geo-positioning analysis based on the above or other geo-positioning metrics. The following geo-positioning analysis criteria may be used:

x_angle_valid_samples>thresh2, there is a valid statistical representation of the cell traffic x_angle_spread_qualify>thresh3, 50ile of the cell traffic is located within an angular range (typically 60° for horizontal and 8° for vertical, which are the most common beamwidths in deployed antenna population)

h_ang_spread_kurt<thresh4, this criterion stands for a uniform distribution of the traffic across the angular range. Geographical isolation of concurrent users in a cell is a desirable characteristic to maximize multi-user mimo (MU-MIMO) performance, based on the spatial orthogonality obtained by using beamforming.

The cells meeting these criteria may then be grouped and sorted or ranked as follows:

i) UE_classifier_criteria_fulfillment=True, CQS× DCI>=Thres5
   i.i sorted by CQS×DCI AND h_angle_criteria_fulfilment=True
   i.ii sorted by CQS×DCI AND h_angle_criteria_fulfilment=False
ii) UE_classifier_criteria_fulfillment=False, CQS× DCI<Thres5
   ii.i sorted by CQS×DCI AND h_angle_criteria_fulfilment=True
   ii.ii sorted by CQS×DCI AND h_angle_criteria_fulfilment=False Cells that do not meet the criteria remain in their own group. This approach allows the cells to be more deeply analyzed, including considering geo-positioning information where available, and therefore to facilitate improved upgrade decisions.

At step 545, the method recommends cells to upgrade. This may be in the form of rankings in geo-positioning groups as described above and/or a simple primary ranking of all cells. Various metrics may be displayed with or available with the cells, as well as graphs such as those of FIGS. 6-7D.

Some embodiments may also provide a gain estimation tool which supplements the recommendation by providing additional information on the benefits of deploying the recommended solution, for example M-MIMO. The gain estimation tool or module takes inputs from the trained classifier at the session level, the cell level ranking, and cell geo-positioning metrics as previously described, and the following non-limiting aspects may be considered.

Digital Sectorization (DS) with Active antenna System (AAS) Frequency Division Duplexing (FDD)—DS with Massive MIMO allows the implementation of multiple cells with the same antenna array on the same carrier frequency using beamforming. The DS solution increases capacity without the need of additional hardware. The main benefits are increased total site throughput for M-MIMO systems in both uplink and downlink and an improved spectral efficiency (SE) in Physical Resource Blocks (PRB) utilization compared with non-AAS (active antenna system) cells. This enables capacity gains when the penetration of Rel-13/14 (3GPP release 13 or 14) terminal equipment is low.

Transmission Mode 9 (TM9) with AAS FDD—Cell Shaping is a form of Cell Specific Beamforming which follows the UE distribution within the cell instead of creating a narrow beam which follows the user. The coverage area is re-shaped to meet and optimize the traffic requirement. The use of available spectrum becomes more efficient and cell capacity is increased because the RF energy available is focused more closely on the users within the cell. Cell specific beamforming is compatible with today's FDD UEs.

UE DL Achievable Throughput on Cell Carrier (UE_DATCC)—the estimation of the downlink (DL) User Throughput which hypothetically could be reached if, when a UE session ends, immediately a new one is established under the same air interface conditions and using the free PRB resources available on that cell. This is an approximation of active throughput.

UE_DATCC is a function of: DL CQI, Modulation, Ranking Indication, PRB utilization, Cell Bandwidth, Cell CFI Mode, UE Capability. For each UE session recorded on CTR collected files, those features are input to the model and a dl throughput value is calculated for the user session. Two UE_DATCC values are calculated per session:

1) Modeling the user session throughput with the present cell configuration, cell quality and cell load conditions as reported on CTR events;
2) A new user throughput value when the M_MIMO gain calculation is introduced.

Then, both pre/post UE session calculated values are aggregated into cell level and, based on these, a cell level gain estimation ratio is calculated.

The UE-DTACC calculation method can be divided into two parts:
a) Evaluation of Raw Bit Information per scheduling block;
b) Evaluation of resources available per scheduling block.

a) Evaluation of Raw Bit Information per scheduling block

Based on the expert knowledge of upgrade products, functions are defined which estimate from SINR (signal to noise ratio) values the respective Normalized Throughput in bits/symbols (Symbol Information—SI).

On CTR traces collected as input, CQI (channel quality index) measurements reported by the UEs are available as DL quality indicators. The first step is to approximate SINR values from reported CQI. After that, SINR can be used to calculate the number of bits per resource elements available on the scheduling block. The method uses CQI and modulation as input to generate SI values that will be used for estimating DL user throughput.

b) Evaluation of resources available per scheduling block

Estimating PRB (physical resource block) cell load and the remaining free cell resources is achieved by considering free PRB resources as the total PRBs available on the cell minus the average PRB utilization over the 60-seconds period when the session is established.

Traffic currently served by the cell may be split into the coverage area of the new digital sectors, based on the georeferenced samples collected by MDT (minimization of drive test) events. The method splits the horizontal angular UE distribution into two sets:

The samples located into the region defined by the horizontal angle between −180° and 0;
The samples located into the region defined by the horizontal angle between 0° and 180°;

The horizontal angle may be transformed and referenced to the cell azimuth as given on a cellmap file. So, all horizontal angle samples will range from −180° to 180°.

If a potential cell to be split in two sectors by implementing digital sectoring has the largest part of its UEs concentrated in one of the regions, it will probably show a lower gain compared to a cell where the traffic is split almost in half between the two regions.

For example: if 90% of UEs are located into −180° to 0°, it's expected that the gain on throughput will be low. Whereas for a case where 51% of traffic is between 0° to 180° the probable gain will be higher. The reason is that the expected new PRB utilization on the new sectors will be very different in those cases.

For cells under extremely high load conditions, an extra PRB utilization after massive MIMO deployment will be considered by the model to estimate the cell gain. This avoids overestimating the gains as it is expected that previously not served traffic (due to high load) will be handled after the solution is implemented.

A factor to estimate the extra PRB utilization when digital sectoring is implemented is a user-input variable applied to all cells under extreme high load. A practical approach to find a reasonable value for this factor may be to evaluate the amount of traffic which is being moved to other layers/cells by load sharing mechanisms.

After running both pre-processes (evaluation of Raw Bit Information per scheduling block and resources available per scheduling block) it is straight forward to estimate the achievable DL throughput as other aspects such as if MIMO 4×4 is available, rank indication and transmission mode usage, etc are known through collected traces.

The next step after having the DTACC per each UE session calculated is to estimate what will happen with this DL throughput if Massive MIMO is implemented on the cell. Based on experimentation and expert knowledge, a set of "control knob" variables may be introduced to fine-tune the expected variations on the elements defining the throughput values, for example, the expected SINR gain after the implementation, the impact on PRB load, etc. With the expected gain components identified, a new dl throughput value is calculated taking into consideration those factors. Thus, two DTACC values (before and after M-MIMO) per each UE session are present. As the diagnostics are planned to be characterized on cell level, the UE session results are aggregated on cell level, currently using a median operator. And the percentual difference between the throughput calculated before and after M-MIMO deployment is the gain estimated per cell.

Gain estimation depending on Cell configuration may be determined as follows.

MIMO 2×2 baseline deployment

Even though MIMO 4×4 can be implemented without AAS site solution, the DL throughput gain resulting should be computed as if the site baseline before the introduction of AAS was MIMO 2×2 only. The gain will be computed as function of:
  SINR expected gain after MIMO4×4 with TM4 is introduced.
  The percentage of UE population which can use MIMO 4×4.
  Estimated percentage of MIMO 4×4 capable UEs sessions which are currently using 2×2 and then will be able to use layer 3 and layer4 at least once per session.
  Estimated percentage of rank3 and rank4 over the total rank reported.

For example, if in a certain cell there are 1000 UE sessions from MIMO 4×4 capable UEs using 2×2 before AAS is deployed, for 300 of those sessions there will be at least one sample with layer3/layer4 when M-MIMO is used. So, the value of the estimated percentage described on the third bullet above will be 30%. Over those 300 sessions, the average percentage of rank3 and rank4 reporting could be for example 10% and 5%, respectively. Therefore, for this scenario, the model will consider that there will be 1000 UEs 4×4 capable, that for 30% of the sessions there will be at least one sample of layer3 or layer4, and the percentage of the utilization of them in each of those 300 sessions will be 10% and 5%, respectively.

Digital sector as AAS FDD choice

The modeled factors which will influence the gain estimation for Digital Sectoring are:
  The balance of traffic between the left and right sectors, based on MDT samples (already described in 3.2.4).
  The amount of traffic which is located at boresight and its expected SINR loss, because of increase of inter-cell interference.
  The estimation of extra PRB utilization that will come from being able to serve users which previously weren't able to connect in extreme high loaded cells.
  No traffic loss due to cell edge UEs being moved to other carriers after M-MIMO implementation is modeled.

Cell shaping as AAS FDD choice

The modeled factors which will influence the gain estimation for TM9 Beamforming scenario are:
  The percentage of traffic which is located at the cell edge region and its SINR expected gain when beamforming is activated.
  The expected symbol information gain expected for TM9 capable UEs in medium quality region.
  The expected symbol information gain expected for TM9 capable UEs in poor quality region.

Output of Gain Estimation Process

The output of the gain estimation process may be a data frame containing the following information on cell level:

TABLE 4

| Column | Description |
| --- | --- |
| Cell | Qualified Cell. |
| UE_DTACC_median | Median value of the distribution on Ue level of UE_DATCC for baseline scenario. |
| UE_DTACC_gain_median | Median value of the distribution on Ue level of UE_DATCC for post scenario. |
| Estimated_Gain | Estimation of the percentual gain comparing UE_DTACC on the baseline and post scenario. |

Figure 8:
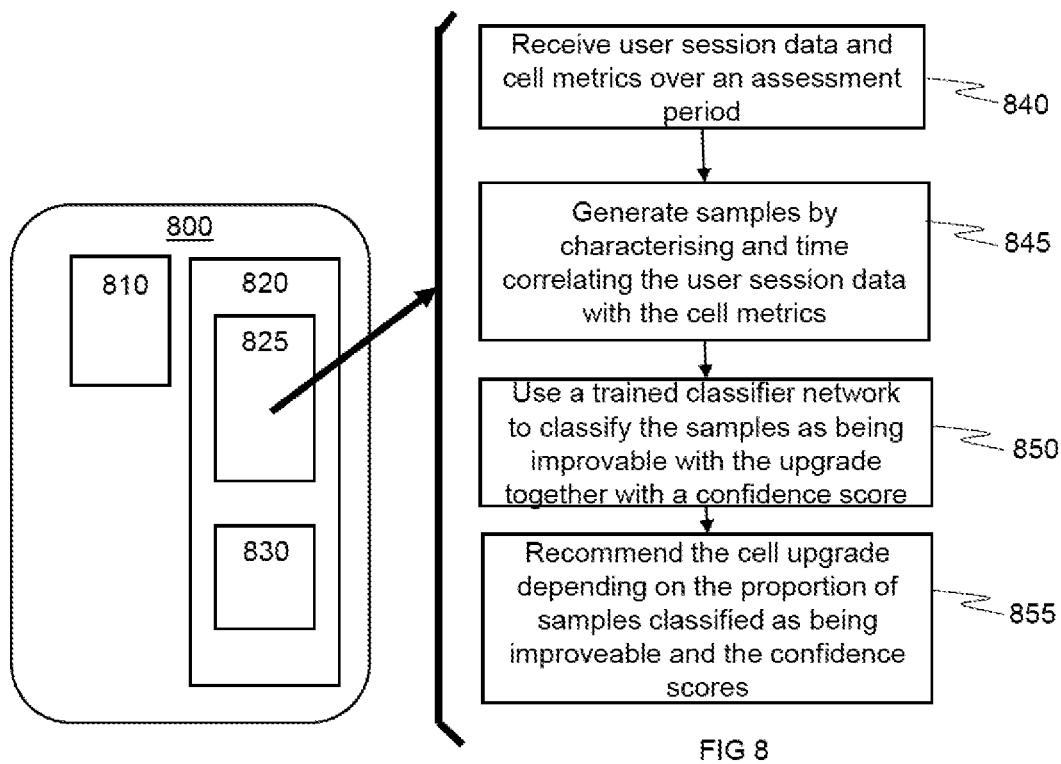
FIG. 8 is a schematic diagram illustrating the architecture of an apparatus according to an embodiment.
Figure 7A:
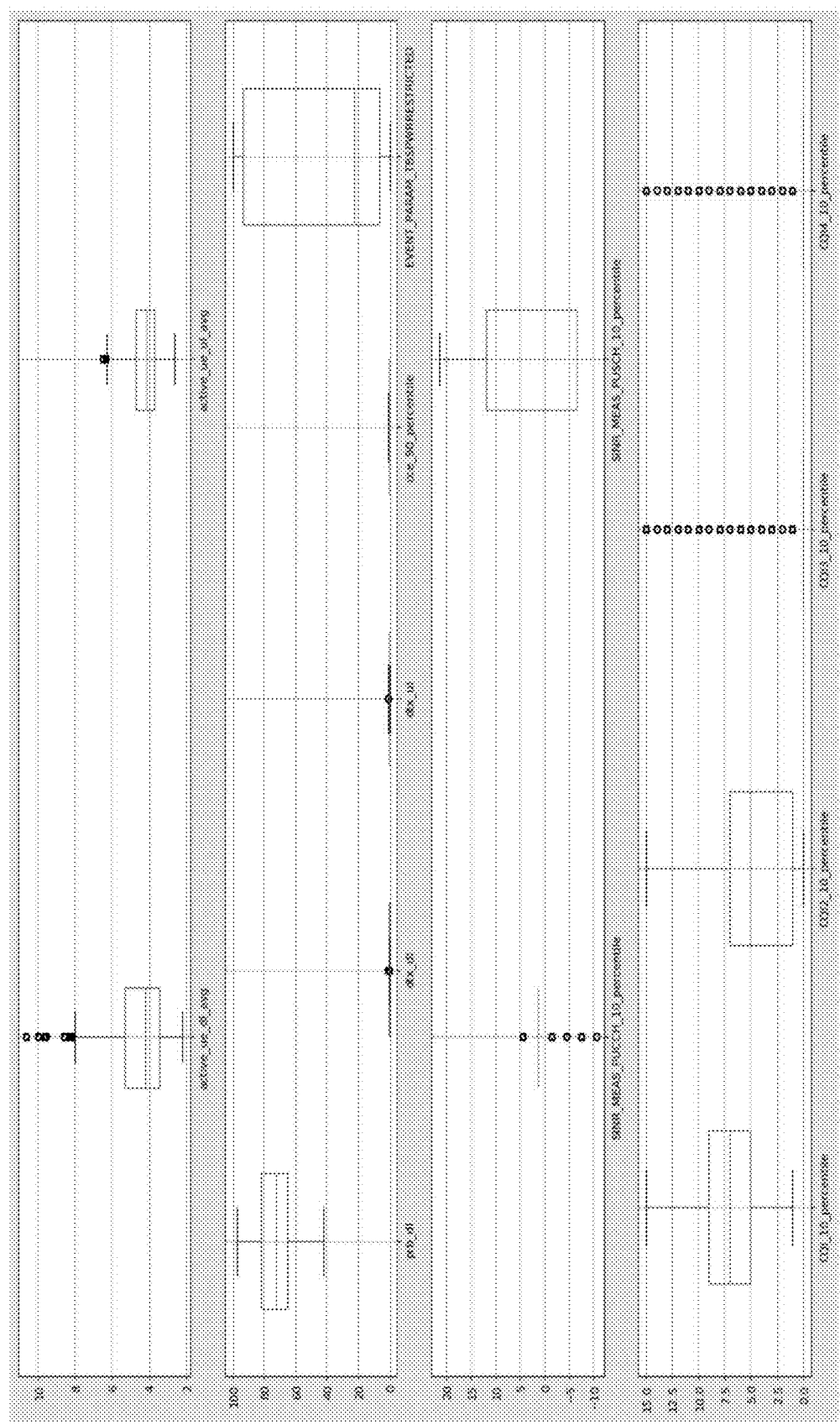
FIG. 7A-7D illustrate representations of some MIMO characterization values at cell level and according to some embodiments.
Figure 7B:
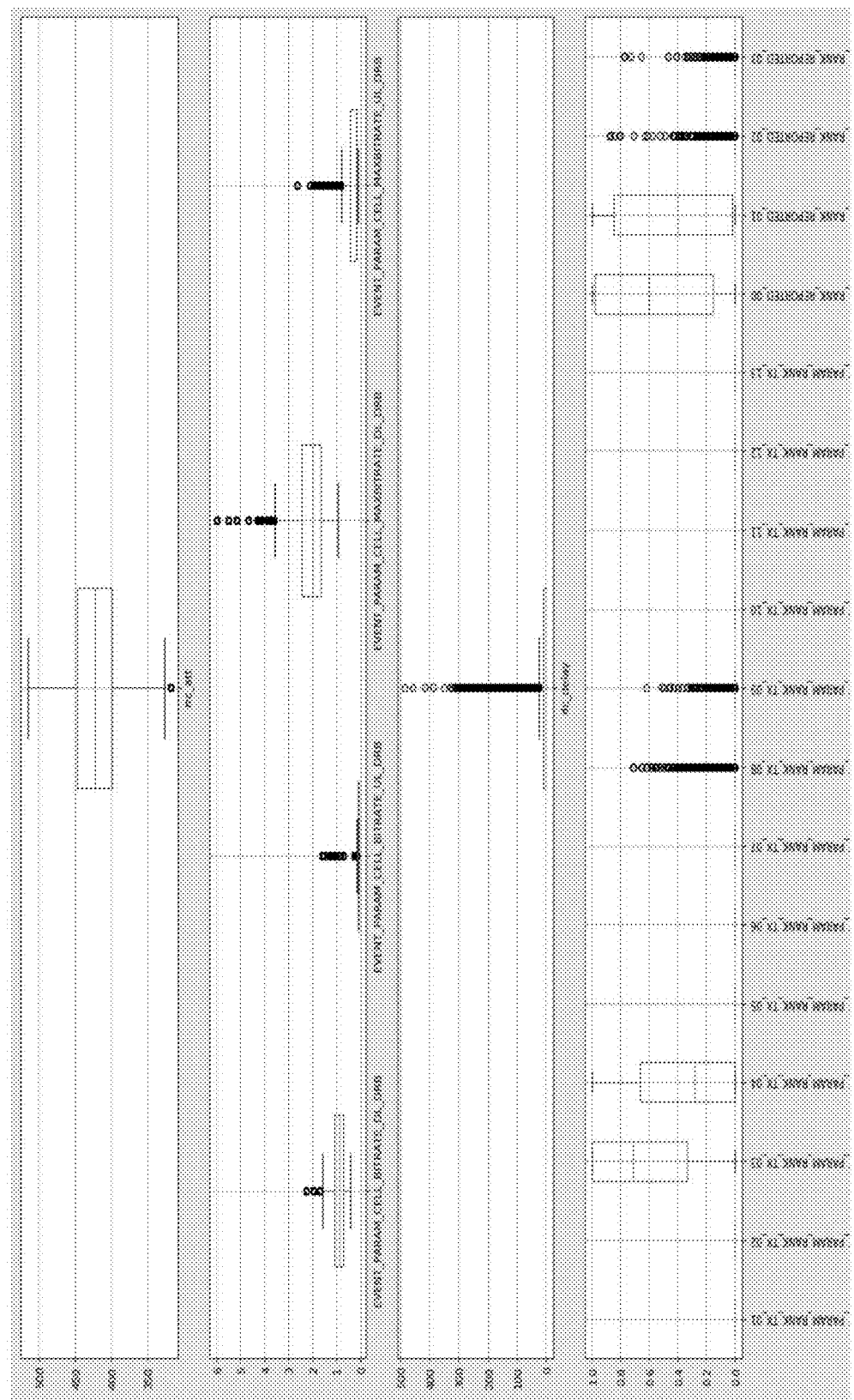
Figure 7C:
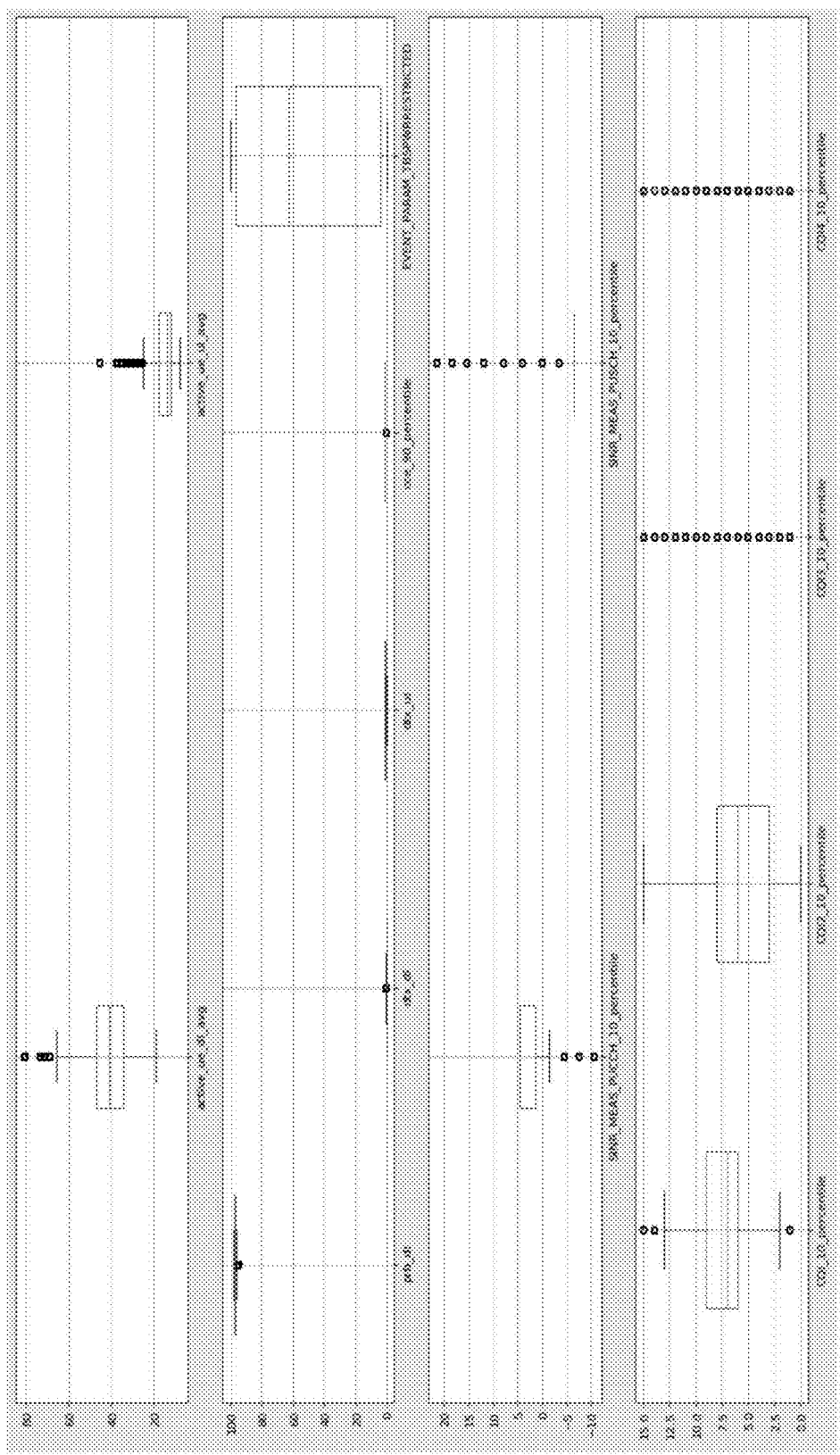
Figure 7D:
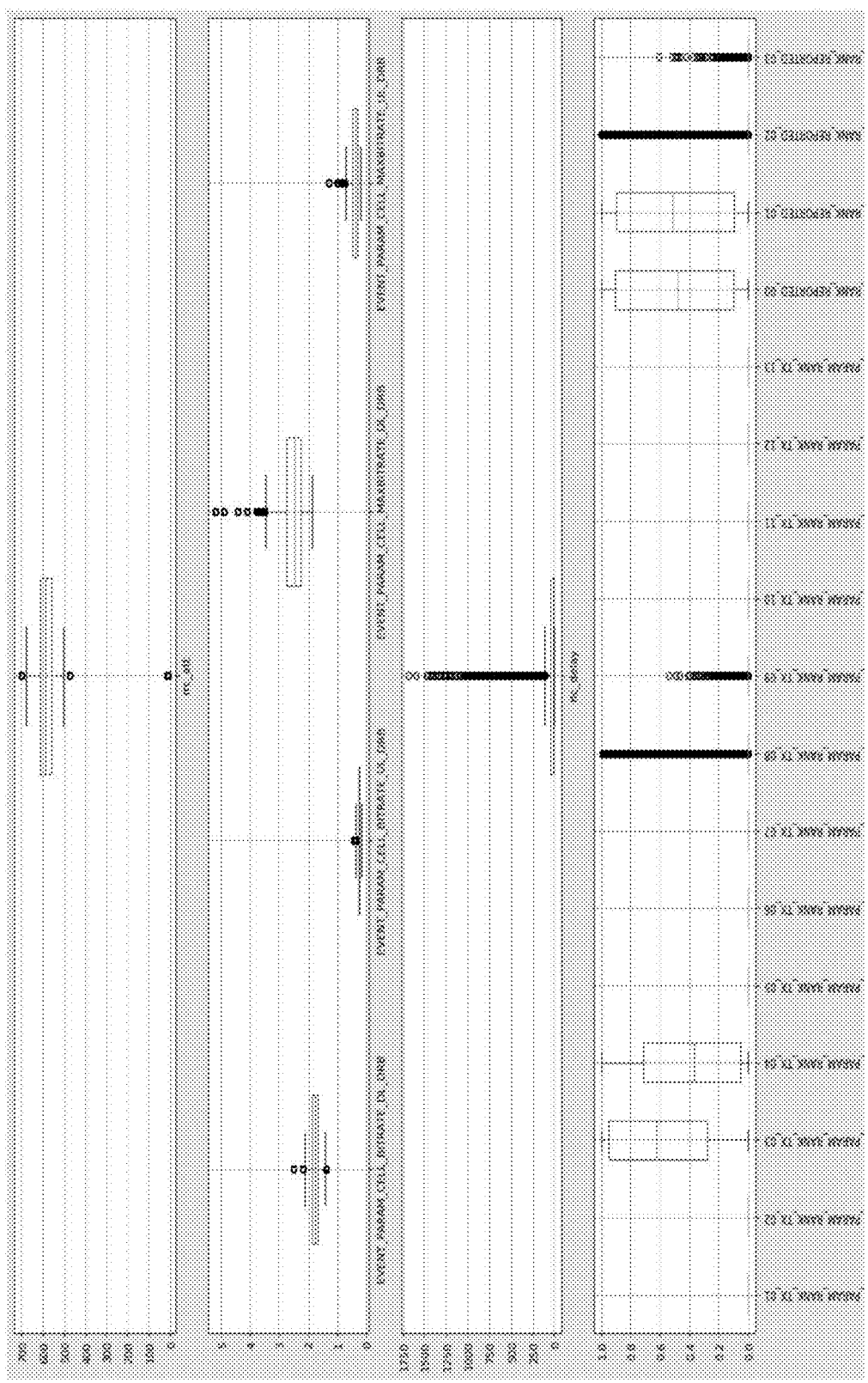
Figure 9:
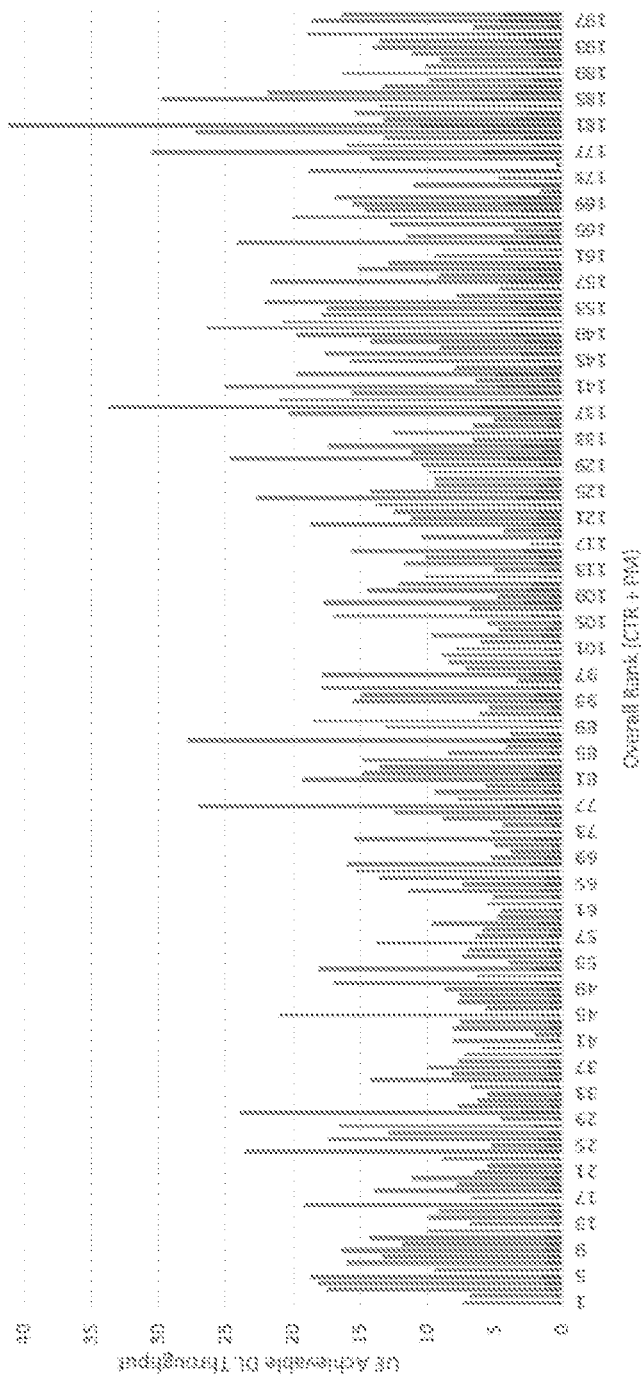
FIG. 9 illustrates cell ranking with an estimated improvement by upgrading.

This information may be used with the secondary ranking as extra criteria to prioritize investment at cell/site level as illustrated in FIG. 9, for example to show the extent of a potential performance gain for each ranked cell. FIG. 8 is a schematic of an apparatus which may be used to monitor or determine an alarm condition in one or more equipment according to embodiments. The apparatus 800 comprises a processor 810, memory 820 containing computer program instructions 825 which when executed by the processor cause the processor to carry out methods of the embodiments. The apparatus also comprises a trained classifier network 830. The apparatus may be implemented in a computer system remotely connected to the cells and user devices, or part of the apparatus may be deployed at the cells at the time of testing and data collection and part deployed remotely for analysis. The apparatus may be implemented in the cloud. An example method is illustrated which includes several steps which may be performed by the apparatus 800.

At a first step 840, the method receives user data sessions and cell metrics over an assessment period, for example as previously described with respect to FIGS. 1, 4 and 5. At step 845, the method generates samples by characterizing the user data and time correlating with the cell metrics, for example as previously described with respect to FIGS. 1, 4 and 5.

At step 850, the method uses a trained classifier network 830 to classify the samples as being improvable with upgrade together with a confidence score. The trained classifier network 830 may be a trained combined classifier network 330, built and trained according to previous embodiments, for example as described with respect to FIGS. 2, 3, and 4. Although trained classifier networks built and/or trained differently could alternatively be used to classify the samples generated from characterizing the user session data and time correlating with the cell metrics.

At step 855, the method aggregates the user session sample classifications and recommends a cell upgrade (or not) depending on the proportion of samples classified as being improvable by an upgrade as well as the confidence scores of the classifications. For example, the ranking approach described with respect to FIG. 5 using the cell upgrade metrics obtained may be used. This may be supplemented or adjusted using geo-positioning analysis as described and may result in a simple list of candidate cells to upgrade or a substantial analysis associated with each cell, for example as described with respect to FIG. 5.

Embodiments may provide a number of advantages including a more granular analysis of each cell. Each end user radio environment is characterized and analyzed individually, which allows direct correlation of relevant cell metrics, and can be performed regularly for example every 60 seconds. This is a significant improvement over known approaches using performance metrics (pm) based on aggregated cell activity which are typically calculated every 15 minutes.

The richer characterization is analyzed using deep learning, which provides a more accurate way of qualifying cells/sites. While pm counter based procedures are able to provide a rigid, rule-based decision threshold, the approach of embodiments using CTR based samples with classification as described provides a continuous ranking across the network/area under analysis, giving flexibility to the operator in order to decide where and when to invest.

The described machine learning based user session data based analysis allows closer correlation with geo-data analysis outcomes, as this can be applied on per UE session level.

Manual labelling of a large amount of data, i.e. whether the user sessions/cells need to be upgraded or not, is not required due to the use of the described semi-supervised approach which can start from a small subset of labelled examples and then use the rest of the samples for training.

The described combined classifier network approach complements the domain expert's knowledge so that the unlabeled data is also automatically labelled and used in the recommendation, hence improving expert's perception.

Whilst the embodiments are described with respect to upgrading LTE cells with M-MIMO technology, other upgrade pathways may be considered using the embodiments. For example alternative embodiments may be used in the roll out of 5G cells by recommending which cells would benefit most from M-MIMO on the different frequencies specified by 5G.

The apparatus and/or methods described may be instantiated in cloud environments such as Docker, Kubernetes or Spark. Alternatively, they may be implemented in dedicated hardware or within the equipment being assessed.

Modifications and other variants of the described embodiment(s) will come to mind to one skilled in the art having the benefit of the teachings presented in the foregoing descriptions and the associated drawings. Therefore, it is understood that the embodiment(s) is/are not limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method for determining a cell upgrade metric, the method comprising:
   receiving samples comprising user session data from user equipment communicating within a cell;
   obtaining training data from the samples by applying filtering rule;
   training an autoencoder using the samples;
   combining encoder and code layers of the trained autoencoder with a classifier network to generate a combined classification network;
   training the combined classification network using the training data; and
   using the trained combined classifier network to classify user session data within the same or a different cell and using a plurality of the classifications to determine the cell upgrade metric for the cell.

2. The method of claim 1, wherein the samples comprise cell metrics which are time correlated with the user session data.

3. The method of claim 2, wherein the user session data is derived from Cell Trace Recording (CTR) data from the user equipment.

4. The method of claim 3, wherein the user session data is characterised over a sample period to generate a respective sample.

5. The method of claim 2, wherein the filtering rule comprises determining whether specified metrics with the samples exceed respective thresholds.

6. The method of claim 1, wherein the filtering rule comprises determining whether specified metrics with the samples exceed respective thresholds.

7. The method of claim 6, wherein the specific metrics comprise performance parameters related to Multiple Input Multiple Output operation.

8. The method of claim 1, comprising:
   using the trained combined classifier network to classify user sessions for a plurality of cells and ranking the cells using respective cell upgrade metrics; and
   adjusting the ranking using geo-positioning data from the respective cells.

9. The method of claim 1, comprising estimating a performance metric improvement by upgrading the or each cell.

10. A method for recommending a cell upgrade, the method comprising:
    receiving user session data and cell metrics over an assessment period;
    generating samples by characterising user session data over respective sample periods from user equipment communicating within a cell and time-correlating the characterised user session data with cell metrics;
    using a trained classifier network to classify the samples as being improvable with the upgrade together with a confidence score; and
    recommending the cell upgrade depending on the proportion of samples classified as being improvable and the confidence scores.

11. The method of claim 10, wherein the combined confidence score is the percentage of samples within an upper and lower range of confidence scores.

12. The method of claim 10, comprising ranking a plurality of cells depending on the respective proportion of samples classified as being improvable and the respective confidence scores, and adjusting the ranking using geo-positioning data from the respective cells.

13. The method of claim 9, comprising estimating an improvement in a performance metric when upgrading the or each cell.

14. An apparatus for determining a cell upgrade metric, the apparatus comprising a processor and memory said, the memory containing instructions executable by the processor whereby the apparatus is operative to:
receive samples comprising user session data from user equipment communicating within a cell;
obtain training data from the samples by applying a filtering rule;
train an autoencoder using the samples;
combine encoder and code layers of the trained autoencoder with a classifier network to generate a combined classification network;
train the combined classification network using the training data; and
use the trained combined classifier network to classify user session data within the same or a different cell and using a plurality of the classifications to determine the cell upgrade metric for the cell.

15. The apparatus of claim 14, operative to:
characterise the user session data over a sample period to generate a respective sample, wherein the user session data is derived from Cell Trace Recording (CTR) data from the user equipment; and
time correlate the samples with cell metrics.

16. The apparatus of claim 14, wherein the filtering rule comprises determining whether performance metrics related to MIMO within the samples exceed respective thresholds.

17. The apparatus of claim 13, operative to:
use the trained combined classifier network to classify user sessions for a plurality of cells and ranking the cells using respective cell upgrade metrics; and
adjust the ranking using geo-positioning data from the respective cells.

18. The apparatus of claim 14, operative to estimate an improvement in a performance metric when upgrading the or each cell.

19. An apparatus for recommending a cell upgrade, the apparatus comprising a processor and memory said, the memory containing instructions executable by the processor whereby the apparatus is operative to:
receive user session data and cell metrics over an assessment period;
generate samples by characterising user session data over respective sample periods from user equipment communicating within a cell and time-correlating the characterised user session data with cell metrics;
use a trained classifier network to classify the samples as being improvable with the upgrade together with a confidence score; and
recommend the cell upgrade depending on the proportion of samples classified as being improvable and the confidence scores.

20. A computer storage medium storing a computer program comprising instructions which, when executed on a processor, cause the processor to carry out a method for determining a cell upgrade metric, the method comprising:
receiving samples comprising user session data from user equipment communicating within a cell;
obtaining training data from the samples by applying filtering rule;
training an autoencoder using the samples;
combining encoder and code layers of the trained autoencoder with a classifier network to generate a combined classification network;
training the combined classification network using the training data; and
using the trained combined classifier network to classify user session data within the same or a different cell and using a plurality of the classifications to determine the cell upgrade metric for the cell.

* * * * *